(12) United States Patent
Biskeborn et al.

(10) Patent No.: US 8,416,526 B2
(45) Date of Patent: Apr. 9, 2013

(54) MAGNETIC HEAD WITH TEXTURED SURFACES

(75) Inventors: Robert G. Biskeborn, San Jose, CA (US); Cherngye Hwang, San Jose, CA (US); Jason Liang, San Jose, CA (US); Calvin S. Lo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/555,716

(22) Filed: Sep. 8, 2009

(65) Prior Publication Data

US 2011/0059336 A1  Mar. 10, 2011

(51) Int. Cl.
*G11B 5/187* (2006.01)
(52) U.S. Cl.
USPC .......................................................... 360/122
(58) Field of Classification Search .................. 360/122
See application file for complete search history.

(56) References Cited

U.S. PATENT DOCUMENTS

| | | | |
|---|---|---|---|
| 4,549,238 A * | 10/1985 | Ertingshausen et al. ... | 360/235.3 |
| 5,010,429 A | 4/1991 | Taguchi et al. ............... | 360/103 |
| 5,083,365 A * | 1/1992 | Matsumoto ................ | 29/603.12 |
| 5,413,850 A | 5/1995 | Nehring ........................ | 428/336 |
| 5,967,880 A | 10/1999 | Major ............................. | 451/36 |
| 6,101,066 A | 8/2000 | Ishihara et al. ................ | 360/103 |
| 6,589,436 B1 * | 7/2003 | Tabib et al. ....................... | 216/52 |
| 2004/0032696 A1 * | 2/2004 | Johnson et al. ............... | 360/317 |

FOREIGN PATENT DOCUMENTS

| | | | | |
|---|---|---|---|---|
| JP | 61204384 A | * | 9/1986 | |
| JP | 63276769 A | * | 11/1988 | |
| JP | 01211210 A | * | 8/1989 | |
| JP | 01285015 A | * | 11/1989 | |
| JP | 05012820 A | * | 1/1993 | |
| JP | 11053727 A | * | 2/1999 | |

OTHER PUBLICATIONS

English-machine translation of JP 05-012820 A to Iwata, published on Jan. 22, 1993.*
"Method of Microroughening the Al203/TiC Substrate of Magnetic Sliders,"Dec. 1, 1983, IBM Technical Disclosure Bulletin, vol. 26, Iss. No. 7A, p. 3264.*

* cited by examiner

*Primary Examiner* — Will J Klimowicz
(74) *Attorney, Agent, or Firm* — Zilka-Kotab, PC

(57) ABSTRACT

A method according to one embodiment includes contacting an oxidant with an AlTiC portion of a magnetic head for recessing TiC grains of the AlTiC portion. A method according to another embodiment includes contacting a peroxide with an AlTiC portion of a magnetic head for recessing TiC grains of the AlTiC portion from a media bearing surface of the AlTiC portion. A magnetic head according to yet another embodiment includes an AlTiC portion having a media bearing surface; and a thin film portion coupled to the AlTiC portion, wherein TiC grains of the AlTiC portion are recessed from the media bearing surface.

19 Claims, 5 Drawing Sheets

MAGNETIC HEAD WITH TEXTURED SURFACES

BACKGROUND

The present invention relates to data storage systems, and more particularly, this invention relates to textured surfaces on a magnetic head.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

Thin film magnetic heads are fabricated by building thin film devices on a ceramic substrate commonly referred to as a "wafer." Common wafer materials include alumina-titanium carbide ($Al_2O_3$—TiC) composites, collectively referred to as AlTiC, and which are generally electrically conductive and typically comprise approximately 30-35% by weight TiC.

After polishing and other processing, the TiC grains 302 in a wafer substrate 306 of a new magnetic head typically protrude above the surrounding alumina 304 as illustrated in FIG. 3A. The TiC grains 302 may protrude above the surface 308 of the surrounding alumina 304 by a distance a of approximately 7 nm and the surface roughness ("Ra") may be between approximately 2 nm to approximately 3 nm. The TiC grains 302 are considerably harder than the alumina 304 of the wafer substrate 306.

After a short period of tape contact during use, the TiC grains 302 tend to wear quickly to about the level 308 of the alumina due to mechanical shearing and oxidation as illustrated in FIG. 3B. Here, the Ra can drop to below 1 nm. At this point, undesirable head-to-tape interface (HTI) stiction forces are believed to be the highest.

Stiction forces at the HTI of a tape drive are a significant issue. The stiction forces can be so high that a drive cannot move the tape during operation. If excessive force is used to move the tape, the tape may be damaged or even break. In addition, if TiC grains protruding from the surrounding alumina break off of the surface of the wafer substrate during use, the separated TiC particles may be pushed through the sensor area by the tape, causing shorting and premature head wear. Therefore, a better way of avoiding the problems caused by stiction would be beneficial.

SUMMARY

A method according to one embodiment includes contacting an oxidant with an AlTiC portion of a magnetic head for recessing TiC grains of the AlTiC portion.

A method according to another embodiment includes contacting a peroxide with an AlTiC portion of a magnetic head for recessing TiC grains of the AlTiC portion from a media bearing surface of the AlTiC portion.

A magnetic head according to yet another embodiment includes an AlTiC portion having a media bearing surface; and a thin film portion coupled to the AlTiC portion, wherein TiC grains of the AlTiC portion are recessed from the media bearing surface.

A magnetic head according to yet another embodiment includes an AlTiC portion having a media-facing surface; and a thin film portion coupled to the AlTiC portion, wherein TiC grains of the AlTiC portion are recessed from the media bearing surface, wherein the media bearing surface of the AlTiC portion is primarily Al-containing grains.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a method includes contacting an oxidant with an AlTiC portion of a magnetic head for recessing TiC grains of the AlTiC portion.

In another general embodiment, a method includes contacting a peroxide with an AlTiC portion of a magnetic head for recessing TiC grains of the AlTiC portion from a media bearing surface of the AlTiC portion.

In another general embodiment, a magnetic head includes an AlTiC portion having a media bearing surface; and a thin film portion coupled to the AlTiC portion, wherein TiC grains of the AlTiC portion are recessed from the media bearing surface.

In another general embodiment, a magnetic head includes an AlTiC portion having a media-facing surface; and a thin film portion coupled to the AlTiC portion, wherein TiC grains of the AlTiC portion are recessed from the media bearing surface, wherein the media bearing surface of the AlTiC portion is primarily Al-containing grains.

Figure 1:
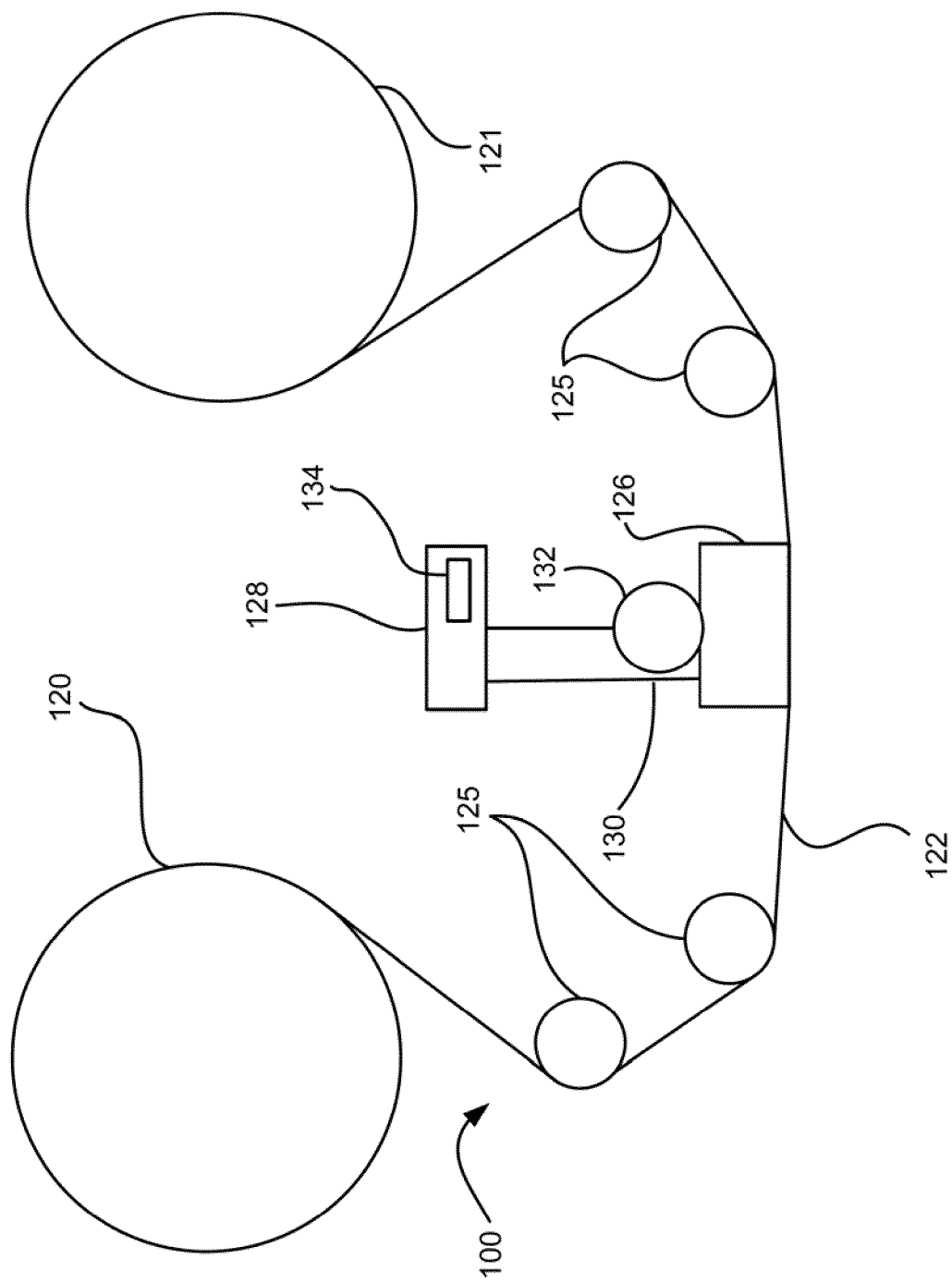
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
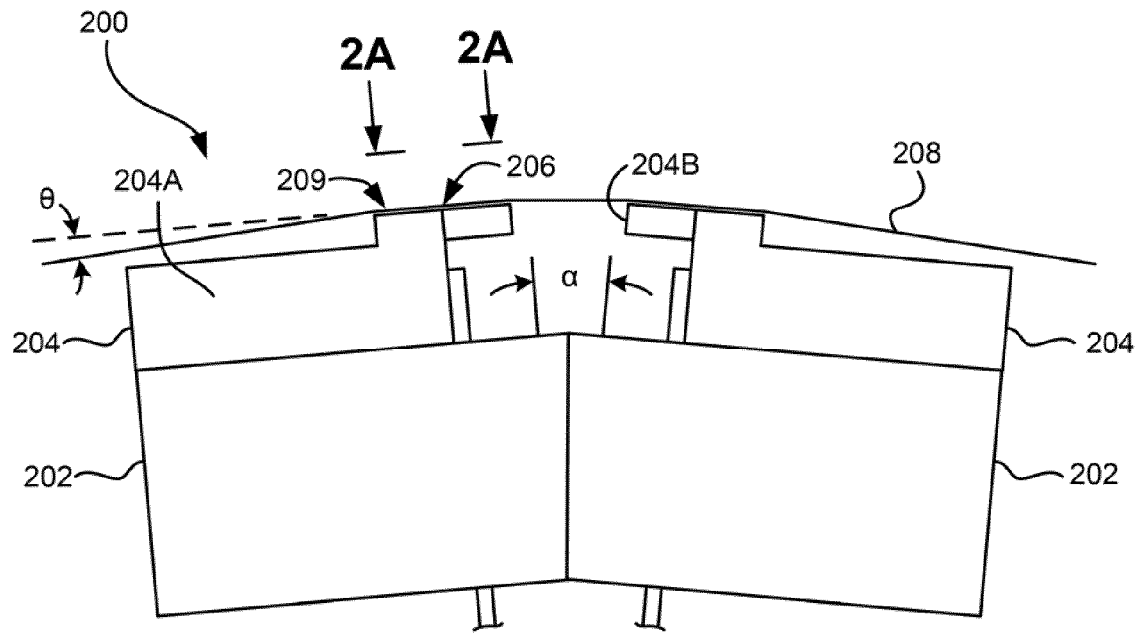
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap comprising elements 206 such as readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
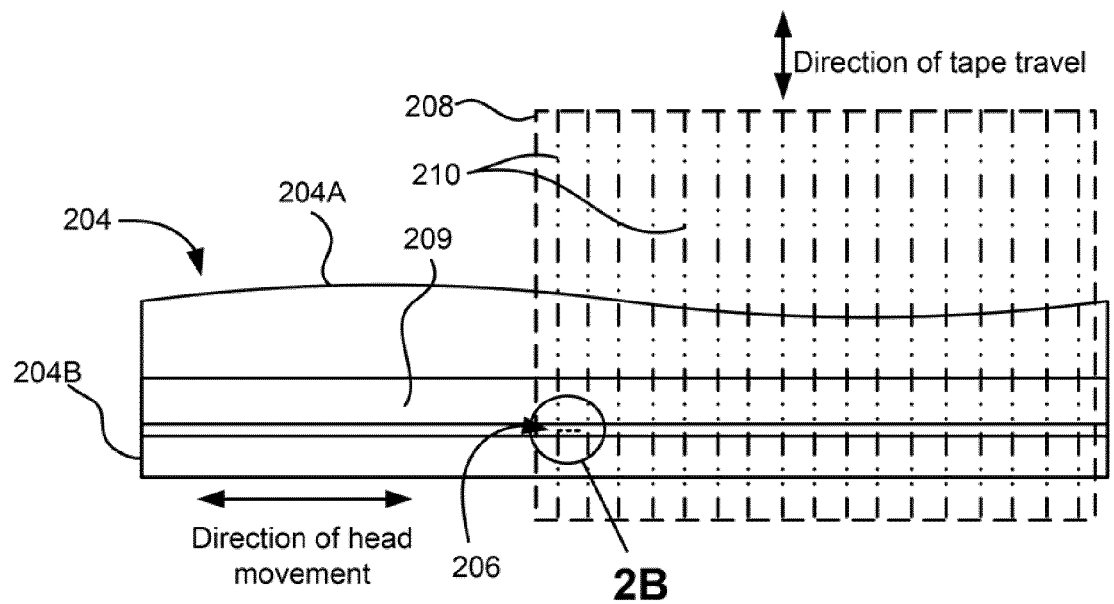
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
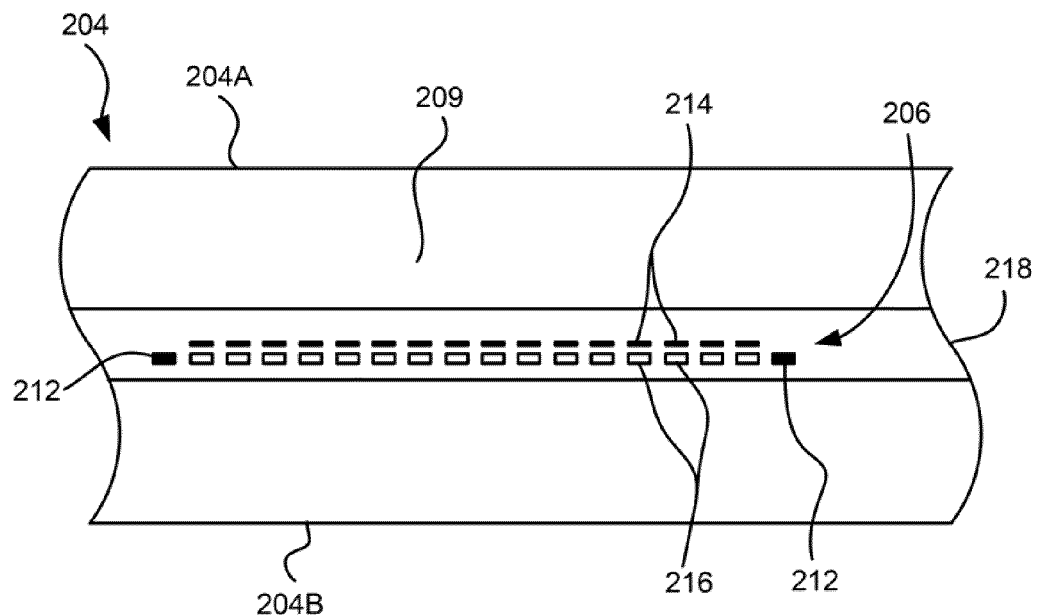
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements 206 per array. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
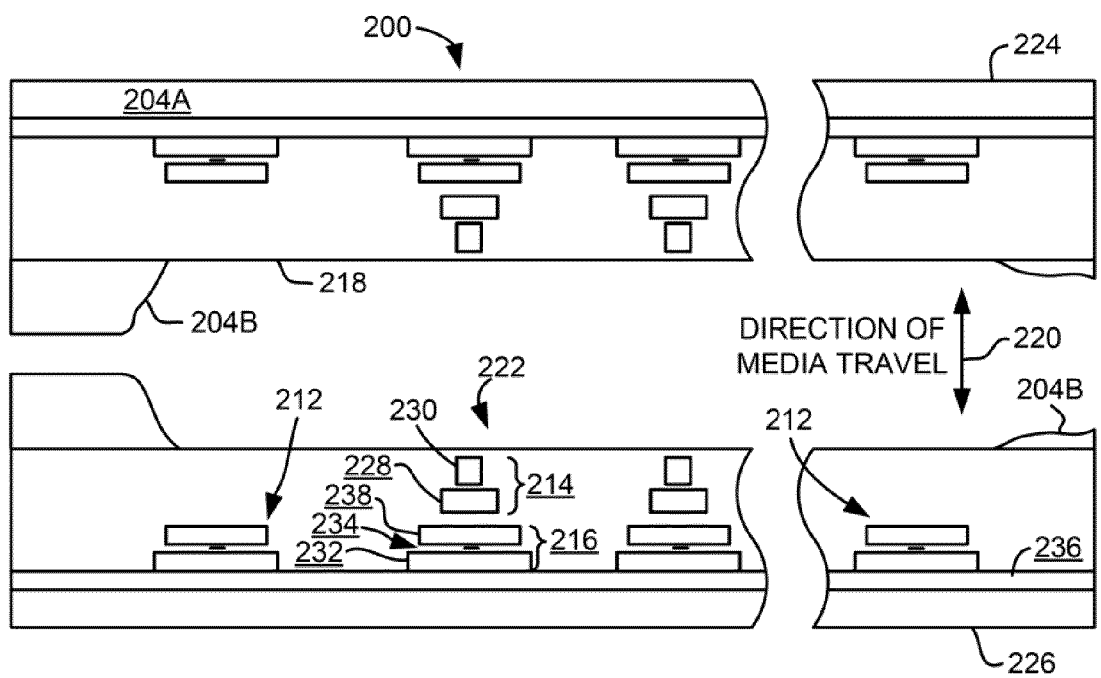
FIG. 2C is a detailed view of a partial tape bearing surface of a pair of modules.
Figure 3A:
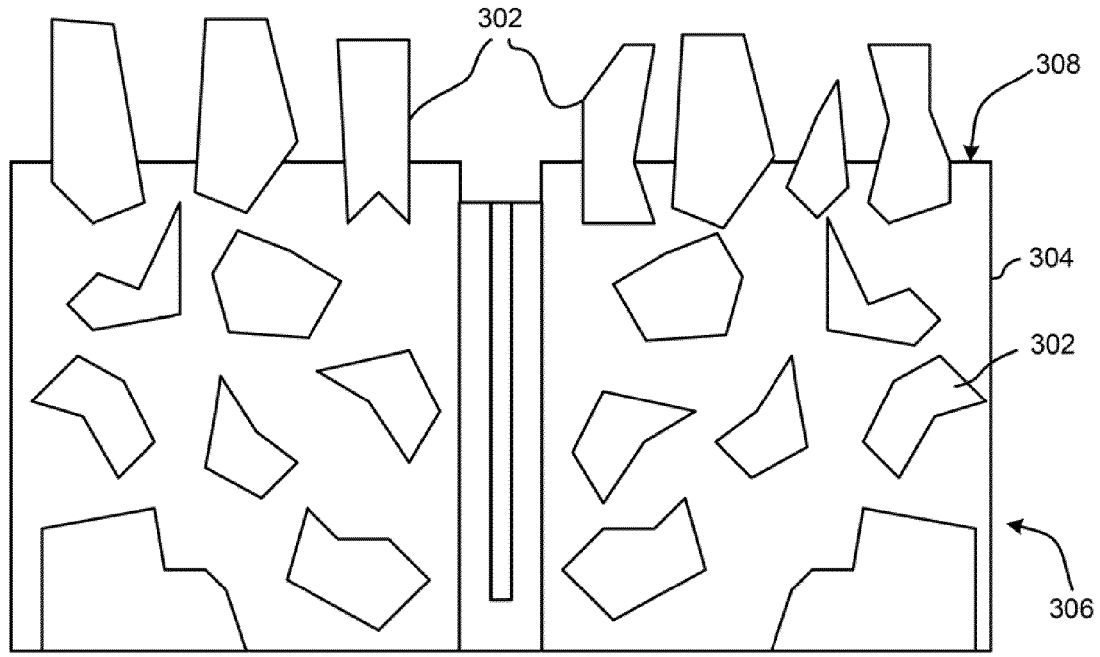
FIG. 3A is a prior art drawing depicting a media surface of a substrate prior to use thereof.
Figure 3B:
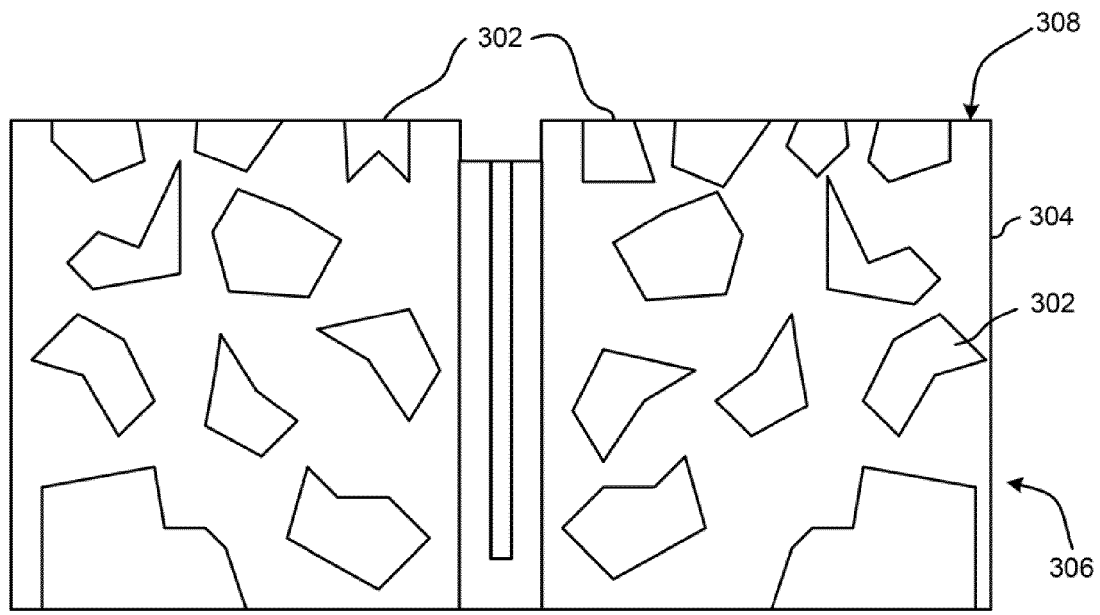
FIG. 3B is a prior art drawing depicting a media surface of a substrate after use thereof.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art.

The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

In some embodiments, a method may include preprofiling (e.g., prior to use) the substrate surface of a thin film magnetic head for magnetic writing and/or reading (such as in a tape drive, hard disk drive, etc.) to minimize undesirable stiction forces without otherwise changing the head surface. Also, in some embodiments, a method may include reducing the potential for free body particles to break off the substrate surface, which can damage the head or lead to premature head wear. While the descriptions included herein are described with reference to preprofiling substrates for heads used in tape drives, it is understood that the descriptions included herein are applicable to substrates used for other purposes, including substrates used to fabricate heads for other types of magnetic storage drives.

Figure 4:
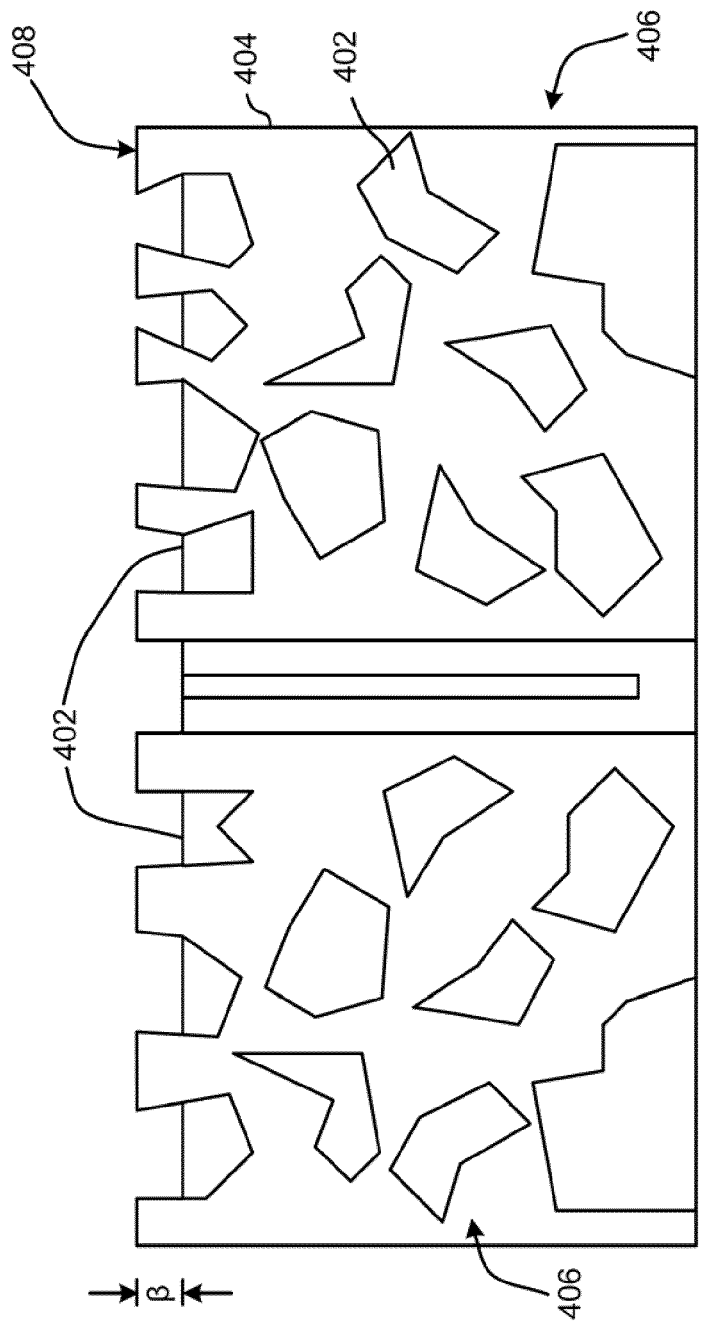
FIG. 4 is a drawing depicting recessed TiC grains near a media surface of a substrate according to one embodiment.

FIG. 4 illustrates a preferred profile of a ceramic wafer substrate 406 from which a thin film magnetic head may be fabricated according to one embodiment. As discussed above, common wafer materials include alumina-titanium carbide ($Al_2O_3$—TiC) composites, which typically comprise about 30-35% by weight TiC. While the descriptions included herein are described with reference to alumina-titanium carbide composite substrates, it is understood that the descriptions included herein are not limited to alumina-titanium carbide composites and are applicable to other wafer substrate materials.

The surface 408 of the wafer substrate 406 corresponds to the surface of the tape head that will be facing the tape during operation. The surface 408 is preprofiled prior to use in a tape drive or the like so that the TiC grains 402 are recessed below the surface 408 of the surrounding alumina 404 by a predetermined depth β such that stiction and friction forces are sufficiently minimized.

In one embodiment, a method to reduce stiction and friction forces by preprofiling the tape bearing surface includes contacting an oxidant with an AlTiC portion of a magnetic head for recessing TiC grains 402 of the AlTiC portion. This may include a chemical etching process, where exposed TiC grains 402 at the surface 408 of the substrate 406 may be dissolved after being soaked for a period of time in the oxidant. In this and other embodiments, recessing TiC grains 402 may include both recession of TiC grains 402 by removal of a portion thereof, as well as complete removal of TiC grains 402 near the surface 408 of the wafer substrate 406. Note that the resultant profile of the AlTiC substrate after the etching or removal process is fairly benign since the head eventually reaches this profile after a sufficient amount of tape wear during use of the head.

Any type of oxidant may be used. In some preferred embodiments, the oxidant may be a peroxide, as would be known to one of skill in the art, such as hydrogen peroxide, magnesium peroxide, etc.

In some approaches, the oxidant may be selected from a group consisting of a hypohalite compound such as hypochlorite, a halogen such as iodine, a halogen compound such as chlorite, chlorate, perchlorate, and other analogous halogen compounds, a permanganate salt, ammonium cerium (IV) nitrate, a hexavalent chromium compound (such as chromic acids, dichromic acids, and chromium trioxide), Pyridinium chlorochromate (PCC), and chromate/dichromate compounds, Tollen's Reagent, a sulfoxide, persulfuric acid, ozone, osmium tetroxide ($OsO_4$), nitric acid, nitrous oxide ($N_2O$), etc.

In some more approaches, the oxidant may be present in a liquid composition, wherein a reaction product of the TiC with the oxidant dissolves into the liquid composition.

In even more approaches, mixtures of oxidants may also be used.

It should be noted that if the write/read elements may react negatively to chemical etching, the active region of the head can be protected prior to the etching process by applying a coating thereover, such as a carbon coating, photoresist, or some other coating. It may also be advantageous to use such a coating to prevent certain regions from etching so that some portions of the head are left with a well-known head-tape-interface while other portions have a roughened surface. The roughened surfaces will still significantly reduce stiction.

Because stiction and friction forces depend upon the surface of the media (e.g., tape), humidity, media lubrication and other factors, the predetermined depth β may vary depending on these factors, but is intended to be a depth such that the stiction and friction forces during drive operation are sufficiently minimized. In some preferred embodiments, the TiC grains 402 may be recessed below the surface 408 of the surrounding alumina 404 by a depth β between approximately 1 nm to in excess of approximately 30 nm, and more preferably between approximately 15 nm and approximately 20 nm. In some preferred approaches, the TiC grains 402 may be recessed at least 5 nm, alternatively at least 10 nm, from a media bearing surface 408 of the AlTiC portion. The surface roughness Ra may be preferably between about 5 nm and about 7 nm.

The recession can be measured for sample holes individually or cumulatively, can be measured relative to a plane extending along a media bearing surface 408 of the AlTiC portion, etc. In one approach, such a plane may be discerned, for example, by placing the media bearing surface 408 on an optical flat or other flat surface after the etching.

By preprofiling the surface 408 of the wafer substrate 406 prior to use, undesirable stiction forces at the head-to-tape interface (HTI) are minimized without otherwise modifying the head surface (e.g., beveling, roughening and/or patterning), which can have adverse affects, cause performance degradations, and increase costs and manufacturing time. In addition, such preprofiling of the surface 408 of the wafer substrate 406 reduces the TiC material near the surface 408 such that the amount of undesirable free body particles at the HTI is minimized.

Other methods may be utilized to preprofile the surface 408 of the substrate 406 so that the TiC grains 402 are recessed below the surface of the surrounding alumina 404. For example, the surface 408 of the wafer substrate 406 may be preprofiled using conventional ion milling or sputtering techniques in which an ion beam is directed on the TiC grains 402 protruding from the surface 408. Portions of the TiC grains 402 exposed to the ion beam may be eroded due to transfer of momentum from the ions to the TiC particles 402 constituting the exposed surface. The ion beam may be produced by any method known to one of skill in the art, such as an ion gun in which a suitable gas, such as argon, is ionized by electron impact and in which the ions so produced are accelerated through a stationary electric field.

Similarly, a reactive ion etching ("RIE") process may be used according to some embodiments to preprofile the surface 408 of the substrate 406 by using chemically reactive plasma to etch or otherwise remove portions of the exposed TiC grains 402 from the surrounding alumina 404 at the surface 408. The plasma may be generated in a vacuum by an electromagnetic field and high energy ions from the plasma may react with the exposed TiC grains 402 on the surface 408.

Also, in some embodiments, a method for preprofiling the surface 408 of the substrate 406 may include contacting a peroxide with an AlTiC portion of a magnetic head for recessing TiC grains 402 of the AlTiC portion from a media bearing surface 408 of the AlTiC portion.

In addition, in some embodiments, the peroxide may be present in a liquid composition, wherein a reaction product of the TiC with the oxidant dissolves into the liquid composition.

In another approach, the TiC grains 402 may be recessed by a sufficient amount, e.g., 10 nm, from the media bearing surface 408 to minimize stiction.

The surface 408 of the substrate 408 may also be preprofiled to recess exposed TiC grains 402 below the surrounding alumina 404 by running abrasive media (e.g., chromium, diamond tape, diamond like carbon (DLC), etc.) over the surface 408 in some embodiments.

While various methods for preprofiling the surface 408 of the wafer substrate 406 have been described, it is understood that this invention is not limited to the specific methods described herein and that other preprofiling techniques may be utilized to recess exposed TiC grains 402 below the surface of the surrounding alumina 404. Moreover, combinations of the foregoing may also be used.

In some different embodiments, the methods described above may be included in the development of a magnetic head. For example, in some embodiments, a magnetic head may comprise an AlTiC portion 406 having a media bearing surface 408. Also, the magnetic head may include a thin film portion coupled to the AlTiC portion 406, wherein TiC grains 402 of the AlTiC portion 406 may be recessed from the media bearing surface 408. Accordingly, the media bearing surface 408 of the AlTiC portion 406 is primarily or entirely Al-containing material (excluding impurities).

In some additional embodiments, sidewalls of the Al-containing grains adjacent the media bearing surface 408 may have shapes and/or orientations characteristic of dissolution of material previously positioned therebetween as opposed to shadowing, redeposition, etc., that is characteristic of dry etching.

In some more approaches, the AlTiC portion 406 may be a substrate of the thin film portion, and the magnetic head may further comprise a closure coupled to the thin film portion, the closure being formed of AlTiC, wherein TiC grains of the closure are recessed from a media bearing surface of the closure. In some embodiments, the AlTiC portion may be a closure.

In another embodiment, the AlTiC portion 406 may be at least one of a closure and a substrate of the thin film portion.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
    an AlTiC portion having a media bearing surface; and
    a thin film portion coupled to and extending directly from the AlTiC portion,
    wherein exposed media facing sides of TiC grains of the AlTiC portion are physically recessed from the media bearing surface by at least 10 nm, the recession of the media facing sides of the TiC grains of the AlTiC portion being for minimizing friction and stiction forces.

2. A head as recited in claim 1, wherein the media facing sides of the TiC grains are recessed at least 15 nm from the media bearing surface.

3. A head as recited in claim 1, wherein the media facing sides of the TiC grains are recessed approximately 15 to approximately 20 nm from the media bearing surface.

4. A head as recited in claim 1, wherein sidewalls of Al-containing grains of the AlTiC portion at ends of the sidewalls immediately adjacent the media bearing surface have shapes or orientations characteristic of dissolution of material previously positioned therebetween.

5. A data storage system, comprising:
    a magnetic head as recited in claim 4;
    a drive mechanism for passing a magnetic medium over the magnetic head; and
    a controller electrically coupled to the magnetic head.

6. A head as recited in claim 1, wherein the AlTiC portion is a substrate of the thin film portion, and further comprising a closure coupled to the thin film portion, the closure being formed of AlTiC, wherein media facing sides of TiC grains of the closure are recessed from a media bearing surface of the closure.

7. A head as recited in claim 1, wherein the AlTiC portion is a closure.

8. A head as recited in claim 1, wherein a surface roughness of the AlTiC portion is between about 5 nm and about 7 nm.

9. A head as recited in claim 1, wherein the media facing sides of the TiC grains are recessed in excess of approximately 30 nm from the media bearing surface.

10. A data storage system, comprising:
    a magnetic head as recited in claim 1;
    a drive mechanism for passing a magnetic medium over the magnetic head; and
    a controller electrically coupled to the magnetic head.

11. A head as recited in claim 1, wherein a corner of the AlTiC portion is defined by an intersection of the media bearing surface and a side of the AlTiC portion oriented perpendicular to the media bearing surface, wherein a media facing side of a layer immediately adjacent the AlTiC portion is recessed from the tape media bearing surface, wherein the side of the AlTiC portion positioned above the media facing side of the layer is exposed.

12. A magnetic tape head, comprising:
an AlTiC portion having a tape bearing surface; and
a thin film portion coupled to the AlTiC portion,
wherein exposed media facing sides of TiC grains of the AlTiC portion are physically recessed from the tape bearing surface by at least 10 nm, the recession of the media facing sides of the TiC grains of the AlTiC portion being for minimizing friction and stiction forces, wherein the tape bearing surface of the AlTiC portion is primarily Al-containing grains,
wherein the AlTiC portion is a substrate of the thin film portion, and further comprising a closure coupled to the thin film portion on an opposite side thereof than the substrate, the thin film portion extending from the substrate to the closure.

13. A head as recited in claim 12, wherein media facing sides of the TiC grains are recessed at least 15 nm from the tape bearing surface.

14. A head as recited in claim 12, wherein the closure is formed of AlTiC, wherein media facing sides of TiC grains of the closure are recessed from a tape bearing surface of the closure.

15. A head as recited in claim 12, wherein a surface roughness of the AlTiC portion is between about 5 nm and about 7 nm.

16. A head as recited in claim 12, wherein the media facing sides of the TiC grains are recessed in excess of approximately 30 nm from the tape bearing surface.

17. A head as recited in claim 12, wherein a corner of the AlTiC portion is defined by an intersection of the tape bearing surface and a side of the AlTiC portion oriented perpendicular to the tape bearing surface, wherein a media facing side of a layer immediately adjacent the AlTiC portion is recessed from the tape bearing surface, wherein the side of the AlTiC portion positioned above the media facing side of the layer is exposed.

18. A head as recited in claim 12, wherein sidewalls of Al-containing grains of the AlTiC portion at ends of the sidewalls immediately adjacent the tape bearing surface have shapes or orientations characteristic of dissolution of material previously positioned therebetween.

19. A data storage system, comprising:
a magnetic head as recited in claim 18;
a drive mechanism for passing a magnetic medium over the magnetic head; and
a controller electrically coupled to the magnetic head.

* * * * *